(12) United States Patent
Choi et al.

(10) Patent No.: US 12,725,296 B2
(45) Date of Patent: Sep. 1, 2026

(54) METHOD AND APPARATUS WITH IMAGE FRAME INFORMATION DETERMINATION

(71) Applicant: Samsung Electronics Co., Ltd., Suwon-si (KR)

(72) Inventors: Ho-Ik Choi, Suwon-si (KR); Yonggonjong Park, Suwon-si (KR); Jaewoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 18/662,406

(22) Filed: May 13, 2024

(65) Prior Publication Data

US 2025/0069257 A1 Feb. 27, 2025

(30) Foreign Application Priority Data

Aug. 25, 2023 (KR) ........................ 10-2023-0111894

(51) Int. Cl.
*G06T 7/73* (2017.01)
*B60W 60/00* (2020.01)
(Continued)

(52) U.S. Cl.
CPC ............. *G06T 7/73* (2017.01); *B60W 60/001* (2020.02); *G06V 10/762* (2022.01); (Continued)

(58) Field of Classification Search
CPC ...... G06T 7/73; B60W 60/001; G06V 10/762; G06V 10/774
See application file for complete search history.

(56) References Cited

U.S. PATENT DOCUMENTS

2004/0091137 A1* 5/2004 Yoon .................... G06V 40/168 382/118
2016/0167653 A1* 6/2016 Malone ................. B60W 10/18 701/23
(Continued)

FOREIGN PATENT DOCUMENTS

JP 2022-129641 A 9/2022
JP 2022-159023 A 10/2022
(Continued)

OTHER PUBLICATIONS

Qin et al. "AVP-SLAM: Semantic Visual Mapping and Localization for Autonomous Vehicles in the Parking Lot" Jul. 8, 2020 (pp. 1-7).

*Primary Examiner* — Jason Holloway
*Assistant Examiner* — Godfrey Aleksander Maciorowski
(74) *Attorney, Agent, or Firm* — NSIP Law

(57) ABSTRACT

A processor-implemented method including determining, from a first image frame, a first amodal region including a visible region in which a static landmark is visible and an occluded region in which the static landmark is occluded, calculating an occluded region confidence information for the occluded region in the first amodal region based on the first amodal region, determining a second amodal region corresponding to the static landmark from a second image frame temporally subsequent to the first image frame, calculating transformation information between the first image frame and the second image frame based on the first amodal region, the second amodal region, and the occluded region confidence information, and calculating localization information of an electronic device comprising the processor based on the transformation information.

16 Claims, 6 Drawing Sheets

(51) Int. Cl.

| | |
|---|---|
| ***G06V 10/762*** | (2022.01) |
| ***G06V 10/774*** | (2022.01) |
| ***G06V 10/776*** | (2022.01) |
| ***G06V 20/58*** | (2022.01) |

(52) U.S. Cl.
CPC .......... *G06V 10/774* (2022.01); *G06V 10/776* (2022.01); *G06V 20/58* (2022.01); *B60W 2420/403* (2013.01); *B60W 2710/20* (2013.01); *B60W 2720/10* (2013.01); *G06T 2207/20081* (2013.01); *G06T 2207/30256* (2013.01)

(56) References Cited

U.S. PATENT DOCUMENTS

| | | | | |
|---|---|---|---|---|
| 2021/0407125 | A1* | 12/2021 | Mahendran .............. | G06N 3/04 |
| 2022/0148284 | A1* | 5/2022 | Kim ....................... | G06V 10/24 |

FOREIGN PATENT DOCUMENTS

| | | | |
|---|---|---|---|
| JP | 7221089 | B2 | 2/2023 |
| KR | 10-1880185 | B1 | 7/2018 |
| KR | 10-2006291 | B1 | 8/2019 |

* cited by examiner

METHOD AND APPARATUS WITH IMAGE FRAME INFORMATION DETERMINATION

CROSS-REFERENCE TO RELATED APPLICATIONS

This application claims the benefit under 35 USC § 119(a) of Korean Patent Application No. 10-2023-0111894, filed on Aug. 25, 2023, in the Korean Intellectual Property Office, the entire disclosure of which is incorporated herein by reference for all purposes.

BACKGROUND

1. Field

The following disclosure relates to a method and apparatus with image frame information determination.

2. Description of Related Art

Semantic road information may include driving information such as lanes in a road, pedestrian crossing lines, parking lines, signs, and the like that may provide significant information to drivers. In a situation where there are many dynamic objects, estimation of the position and route of a moving object based on semantic road information may be utilized for stable autonomous driving and parking in underground parking lots where a lot of dynamic objects such as people and vehicles move.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including determining, from a first image frame, a first amodal region including a visible region in which a static landmark is visible and an occluded region in which the static landmark is occluded, calculating an occluded region confidence information for the occluded region in the first amodal region based on the first amodal region, determining a second amodal region corresponding to the static landmark from a second image frame temporally subsequent to the first image frame, calculating transformation information between the first image frame and the second image frame based on the first amodal region, the second amodal region, and the occluded region confidence information, and calculating localization information of an electronic device comprising the processor based on the transformation information.

The calculating of the occluded region confidence information may include calculating, for a first pixel in the occluded region in the first amodal region, first pixel confidence information for the first pixel based on a first pixel count corresponding to a first number of pixels included in the visible region in the first amodal region and a second pixel count corresponding to a second number of pixels included in the occluded region in the first amodal region, among first plural pixels included in a surrounding region of the first pixel.

The calculating of the first pixel confidence information may include calculating the first pixel confidence information based on a first ratio of the first pixel count to a sum of the first pixel count and the second pixel count.

The calculating of the occluded region confidence information may include calculating, for a cluster divided from the first amodal region, cluster confidence information for the cluster based on a principal component analysis (PCA) of second plural pixels included in the cluster.

The calculating of the cluster confidence information may include obtaining a first eigenvalue according to the PCA and a second eigenvalue less than or equal to the first eigenvalue and calculating pixel confidence information for each pixel of the second plural pixels based on a second ratio of the first eigenvalue to a sum of the first eigenvalue and the second eigenvalue.

The calculating of the transformation information may include calculating, for first transformation information for a transformation between the first amodal region and the second amodal region, a loss value by applying the occluded region confidence information to a transformation of the occluded region in the first amodal region and updating the transformation information based on the calculated loss value.

The method may include calculating first occluded region confidence information for the occluded region in the first amodal region, and calculating second confidence information for the occluded region in the second amodal region based on the second amodal region, and the calculating the transformation information may be based on the first amodal region, the second amodal region, the first occluded region confidence information, and the second occluded region confidence information.

The calculating of the transformation information may include calculating, for first transformation information for transformation between a second pixel in the first amodal region and a third pixel in the second amodal region, a loss value by applying the first occluded region confidence information to the first transformation based on that the second pixel is included in the occluded region in the first amodal region and calculating the loss value by applying the second occluded region confidence information to the transformation between the second pixel and the third pixel based on that the third pixel is included in the occluded region in the second amodal region.

The determining of whether the first amodal region is visible may include detecting the visible region from the first image frame and determining the occluded region is in the first image frame by applying a machine learning model to the visible region.

The machine learning model may be trained by supervised learning using a visible region in which a static landmark is visible in a first image, and a training input and a training output, the training input and the training output being based on a second image generated by adding an object to the first image in which the static landmark is visible.

The electronic device may be mounted on a moving object and the method may further include controlling a motion of the moving object based on the calculated localization information.

The controlling of the motion of the moving object may include adjusting a speed of the moving object responsive to the transformation information indicating the speed of the moving object is different than a desired speed of the moving object and adjusting a steering of the moving object responsive to the transformation information indicating the moving object is outside of a desired path for the moving object.

In a general aspect, here is provided an electronic device including one or more processors configured to execute instructions and a memory storing the instructions, wherein execution of the instructions configures the one or more processors to determine a first amodal region including a visible region in which a static landmark is visible and an occluded region in which the static landmark is occluded from a first image frame, calculate occluded region confidence information for the occluded region in the first amodal region based on the first amodal region, determine a second amodal region corresponding to the static landmark from a second image frame temporally subsequent to the first image frame, calculate transformation information between the first image frame and the second image frame based on the first amodal region, the second amodal region, and the occluded region confidence information, and calculate localization information of the electronic device based on the transformation information.

The processors may be further configured to calculate, for a first pixel in the occluded region in the first amodal region, first pixel confidence information for the first pixel based on a first pixel count corresponding to a first number of pixels included in the visible region in the first amodal region and a second pixel count corresponding to a second number of pixels included in the occluded region in the first amodal region, among first plural pixels included in a surrounding region of the first pixel.

The calculating of the first pixel confidence information may be based on a first ratio of the first pixel count to a sum of the first pixel count and the second pixel count.

The one or more processors may be further configured to calculate, for a cluster divided from the first amodal region, cluster confidence information for the cluster based on a principal component analysis (PCA) of second plural pixels included in the cluster.

The one or more processors may be further configured to obtain a first eigenvalue according to the PCA and a second eigenvalue less than or equal to the first eigenvalue and calculate confidence information for each pixel of the second plural pixels based on a second ratio of the first eigenvalue to a sum of the first eigenvalue and the second eigenvalue.

The one or more processors may be further configured to calculate, for first transformation information for a transformation between the first amodal region and the second amodal region, a loss value by applying the confidence information to a transformation of the occluded region in the first amodal region and update the transformation information based on the calculated loss value.

The one or more processors may be further configured to calculate first occluded region confidence information for the occluded region in the first amodal region, calculate second occluded region confidence information for the occluded region in the second amodal region based on the second amodal region, and calculate the transformation information based on the first amodal region, the second amodal region, the first occluded region confidence information, and the second occluded region confidence information.

The electronic device may be provided in a moving object and the one or more processors may be further configured to control a motion of the moving object based on the calculated localization information.

Figure 1:
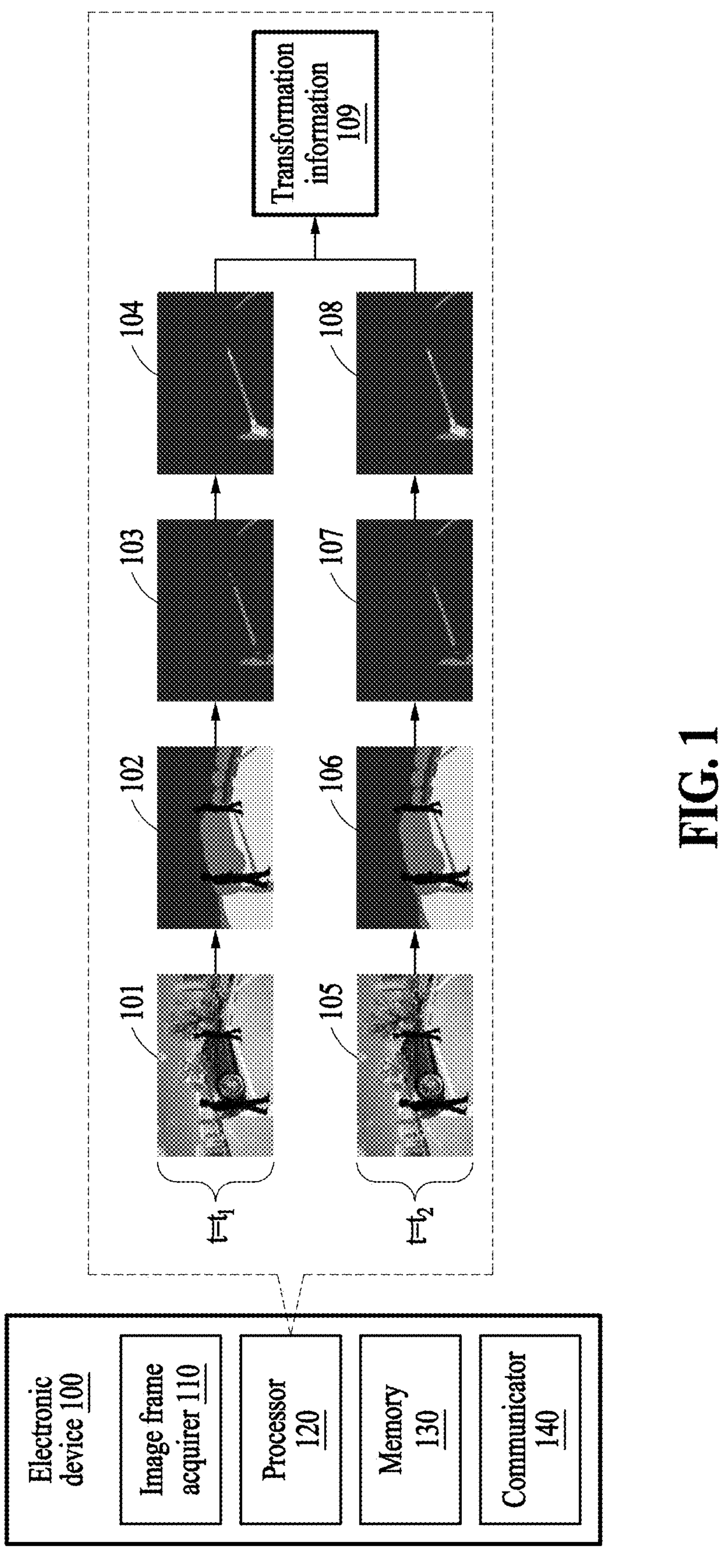
FIG. 1 illustrates an example electronic device according to one or more embodiments.

Throughout the drawings and the detailed description, unless otherwise described or provided, the same drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being “on”, “connected to,” “coupled to,” or “joined to” another component, element, or layer it may be directly (e.g., in contact with the other component or element) “on”, “connected to,” “coupled to,” or “joined to” the other component, element, or layer or there may reasonably be one or more other components, elements, layers intervening therebetween. When a component or element is described as being “directly on”, “directly connected to,” “directly coupled to,” or “directly joined” to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example electronic device according to one or more embodiments.

Referring to FIG. 1, in a non-limiting example, an electronic device 100 may acquire image frames. The image frames may have been captured/received at different timepoints, respectively. In an example, the electronic device may move and, as a result, one or more of the positions or poses received by the electronic device 100 may differ at the timepoints. As the electronic device 100 moves, the localization information of the electronic device 100 may change over the timepoints. The localization information of the electronic device 100 may include at least one of information corresponding to the position of the electronic device 100 (hereinafter, referred to as "position information") or information corresponding to the pose of the electronic device 100 (hereinafter, referred to as "pose information").

In an example, the electronic device 100 may determine the localization information of the electronic device 100 at each timepoint using a static landmark included in the image frames. For example, the electronic device 100 may determine transformation information between a first image frame (or a first coordinate system of the first image frame) and a second image frame (or a second coordinate system of the second image frame) based on the static landmark. The transformation information may include rotation information and/or translation information (e.g., in the form of one or corresponding matrices).

In an example, the static landmark may be an object on the ground that is located at the same physical position throughout the timepoints. The static landmark may be, for example, at least one of a road surface marking, a tubular marker, a curb, a tree, a car stopper, a telephone pole, or the like. The road surface marking may be a type of traffic safety sign, which may be a marking drawn on the ground (or road) with letters or symbols to convey information to users. For example, the road surface marking may include at least one of a lane boundary line, a center line, a parking line, etc.

In an example, a (i.e., a first) portion of the static landmark may be visible in an image frame and another (i.e., a second) portion thereof may be invisible in the image frame. For example, the other portion of the static landmark may not be shown in the image frame because the physical object was occluded (from view of the capturing device) by another object when the image frame was captured. The other object may be an object that is different from the static landmark and is visible in an occluded region in which the static landmark is occluded (i.e., the other object may occlude the occluded region of the static landmark from the capturing device). The other object may be located at a first position at a first of the timepoints, and at a second position (different from the first position) at a second of the timepoints. When the other object is located at different physical positions at the respective timepoints, the other object may also be referred to as a dynamic object. For example, the other object may be a vehicle (e.g., a vehicle different from the ego vehicle, i.e., the vehicle on which the electronic device 100 is mounted), a person, an animal, etc. In various examples of the present disclosure, it is mainly described that the other object is a dynamic object, but these examples are not limited thereto. For example, the other object may be an object that is different from the static landmark and remains at the same physical position for each of the timepoints.

The electronic device 100 may detect, or determine the presence of, a visible region (a region in the image frame in which the static landmark is visible). The electronic device 100 may determine that there is an occluded region (relative to the image) corresponding to occlusion of the static landmark, and may make that determination based on the detected visible region. In various examples of the present disclosure, the visible region may be referred to as the "modal region" That is, the modal region are parts of the scene detected by an image sensor that are directly visible or observable by the image sensor. In addition, the occluded region may be referred to as the "occlusion region". The occlusion region is the portion of the image or scene that is partially or completely hidden by another object.

Figure 6:
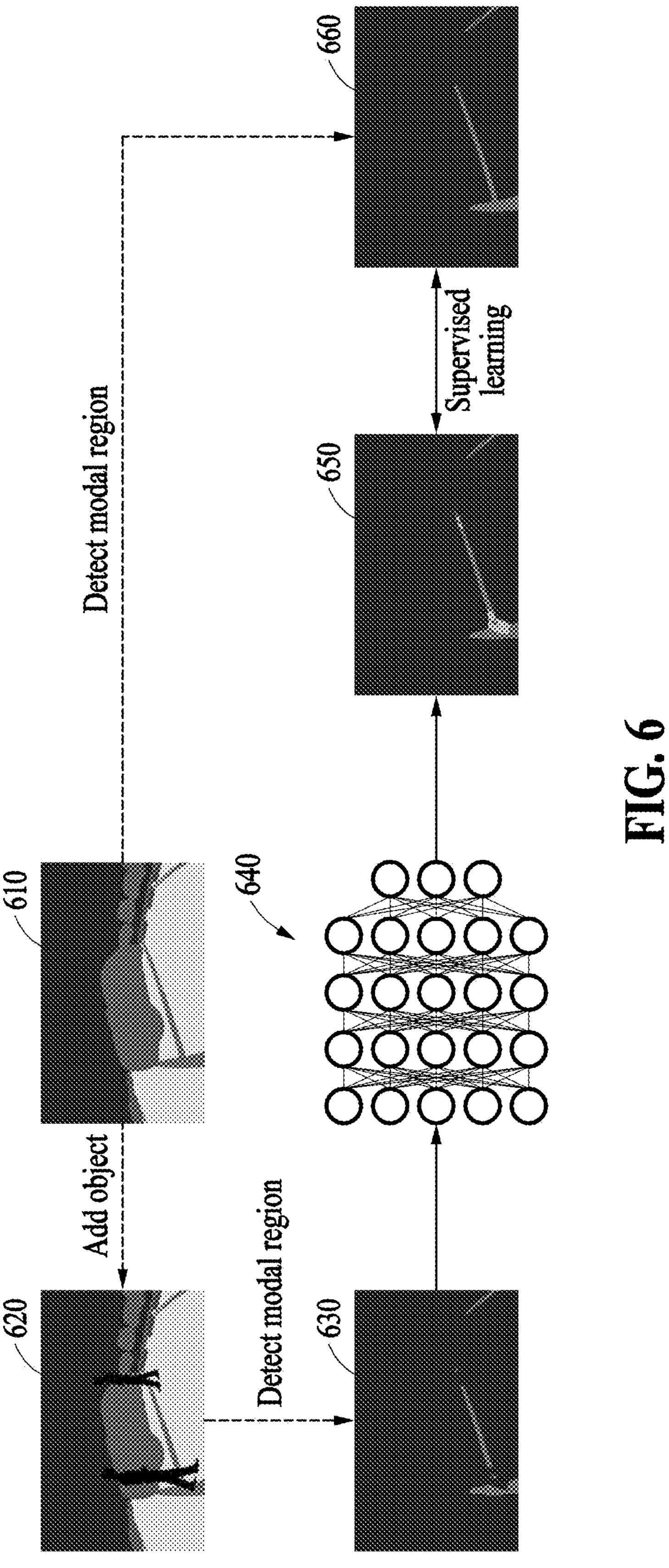
FIG. 6 illustrates an example method of determining an occluded region in which a static landmark is occluded from a visible region in which the static landmark is visible using a machine learning model by an electronic device according to one or more embodiments.

As described in with reference to FIG. 6, in an example, the electronic device 100 may determine the occluded region (corresponding to occlusion of the static landmark) by applying a machine learning model to the visible region. In an example, the machine learning model may include/be a model trained such that it can output (infer) an amodal image region including the occluded region (a region corresponding physical occlusion of the static landmark), when applied to the visible image region (in which the static landmark is visible). The amodal region may include the visible region and the occluded region, in the image frame.

In an example, the electronic device 100 may determine confidence information for the occluded region. The electronic device 100 may determine transformation information between the first image frame and the second image frame based on the determined confidence information. As described with reference to FIG. 2, the confidence information may indicate a likelihood that the occluded region, in which the static landmark is occluded, is included in a real amodal region (i.e., how likely the occluded region is correctly a region corresponding to occlusion of the static object).

In an example, the electronic device 100 may use the confidence information of the occlusion region in the amodal region, which may be determined from the image frames, to determine the transformation information. The electronic device 100 may use the confidence information to reflect the possibility of errors inherent in the determination of the occlusion region. For example, the electronic device 100 may determine that the confidence information indicates there is a low confidence when an error occurs in the determination of the occlusion region. The electronic device 100 may reduce the effect/usage of the occlusion region based on the confidence information when determining the transformation information between the image frames. Thus, the electronic device 100 may determine accurate transformation information even when an error occurs in the determination of the occlusion region. The determination of the confidence information is described with reference to FIGS. 3 to 4.

In an example, the electronic device 100 may include an image frame acquirer 110, a processor 120, a memory 130, and a communicator 140.

The processor 120 may be configured to execute programs or applications to configure the processor 120 to control the electronic apparatus 100 to perform one or more or all operations and/or methods involving the reconstruction of images, and may include any one or a combination of two or more of, for example, a central processing unit (CPU), a graphic processing unit (GPU), a neural processing unit (NPU) and tensor processing units (TPUs), but is not limited to the above-described examples.

The memory 130 may include computer-readable instructions. The processor 200 may be configured to execute computer-readable instructions, such as those stored in the memory 130, and through execution of the computer-readable instructions, the processor 120 is configured to perform one or more, or any combination, of the operations and/or methods described herein. The memory 130 may be a volatile or nonvolatile memory.

The communicator 140 (e.g., an I/O interface) may include user interface may provide the capability of inputting and outputting information regarding the electronic device 100, and other devices. The communicator 140 may include a network module for connecting to a network and a module for forming a data transfer channel with a mobile storage medium. In addition, the user interface may include one or more input/output devices, such as a display device, a mouse, a keyboard, a speaker, or a software module for controlling the input/output device.

The communicator 140 may establish a wired communication channel and/or a wireless communication channel with an external device (e.g., another electronic device or a server), and may, for example, establish communication through cellular communication, short-range wireless communication, local area network (LAN) communication, Bluetooth, wireless fidelity (Wi-Fi) direct or infrared data association (IrDA), or a long-range communication network such as a legacy cellular network, a fourth generation (4G) and/or fifth generation (5G) network, next generation communication, the Internet, or a computer network (e.g., LAN or WAN).

In an example, the image frame acquirer 110 may acquire an image frame. For example, the image frame acquirer 110 may include vision sensors (e.g., a camera sensor, a lidar sensor, a radar sensor, an infrared sensor, and/or a depth sensor). The image frame acquirer 110 may generate an image frame captured with respect to the surroundings of the electronic device 100. In a non-limiting example, the image frame acquirer 110 may generate the image frame by processing partial image frames generated from the vision sensor(s). For example, the image frame acquirer 110 may generate an aerial view, i.e., a viewpoint of viewing the electronic device 100 in a direction perpendicular to the ground (from above). The ariel view may be generated from the partial image frames captured with respect to different directions based on the electronic device 100. In an example, the aerial view may also be referred to as a bird's-eye view and/or a surround view. That is, the electronic device 100 may create (e.g., synthesize) a bird's-eye view image from the image frames of the surrounding area.

The processor 120 may acquire a first image frame 101 and a second image frame 105 through the image frame acquirer 110. The processor 120 may detect first semantic information 102 from the first image frame 101. The processor 120 may determine a first modal region 103 in which a static landmark is visible in the first image frame 101 based on the first image frame 101 or the first semantic information 102. The processor 120 may determine a first amodal region 104, where the first amodal region 104 includes the first modal region 103 and a first occlusion region (corresponding to physical occlusion of the static landmark) in the first image frame 101, and may do so based on the first modal region 103 in which the static landmark is visible. The processor 120 may determine first confidence information for the first occlusion region.

The processor 120 may determine at least one of second semantic information 106, a second modal region 107 in the second image frame 105, a second amodal region 108, and/or second confidence information, in a manner the same as or similar to the operation as described above with respect to the first image frame 101.

The processor 120 may determine transformation information 109 between the first image frame 101 and the second image frame 105 based on at least one of the first amodal region 104, the second amodal region 108, the first confidence information, and/or the second confidence information.

The memory 130 may temporarily and/or permanently store at least one or more of the image frames (e.g., the first image frame 101 and the second image frame 105), the semantic information (e.g., the first semantic information 102 and the second semantic information 106), the modal regions (e.g., the first modal region 103 and the second modal region 107), the amodal regions (e.g., the first amodal region 104 and the second amodal region 108), the confidence information (e.g., the first confidence information and the second confidence information), and the transformation information 109. The memory 130 may store instructions which may configure the process to perform one or more of acquiring image frames, determining amodal regions, determining confidence information, determining transformation information between the image frames, and/or determining localization information of an electronic device. However, those instructions are merely examples, and the information stored in the memory 130 is not limited thereto.

In an example, the communicator 140 may transmit and receive at least one of the image frames, the semantic information, the modal regions, the occlusion region, the amodal regions, and the transformation information.

Figure 2:
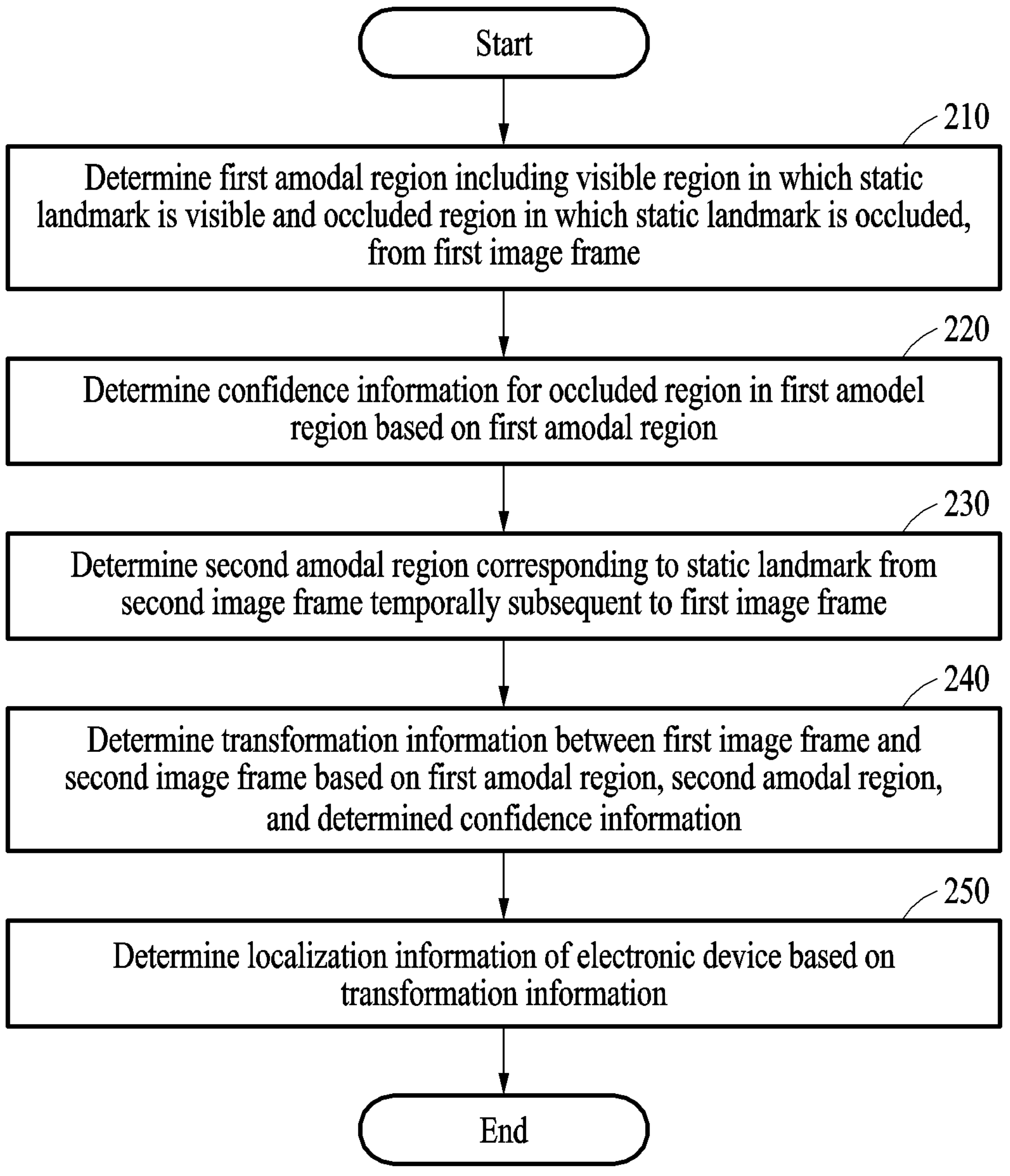
FIG. 2 illustrates an example method of determining localization information of an electronic device according to one or more embodiments.

FIG. 2 illustrates an example method of determining localization information of an electronic device according to one or more embodiments.

Referring to FIG. 2, in a non-limiting example, an electronic device (e.g., the electronic device 100 of FIG. 1) may detect amodal regions from image frames, respectively, and determine localization information of the electronic device using transformation information between the detected amodal regions.

In an example, in operation 210, the electronic device may determine a first amodal region including a visible region in which a static landmark is visible and an occluded region of the first image that corresponds to physical occlusion of the static landmark.

The visible region may be a region visible to a vision sensor included in an image frame acquirer (e.g., the image frame acquirer 110 of FIG. 1), in the first image frame. The occluded region may be an image region corresponding to a part of the static landmark that is not visible to the vision sensor, in the first image frame. For example, in the first image frame, the occluded region may include a region corresponding to another object occluding the static landmark is visible or blocks some of the static landmark. As mentioned above, in various examples of the present disclosure, the visible region may be referred to as the "modal region", and the occluded region may be referred to as the "occlusion region".

In an example, the electronic device may detect the visible region from the first image frame. For example, the electronic device may obtain a semantic map from the first image frame. The semantic map may indicate information about an object that is visible in the first image frame (i.e., an object detected by semantic analysis reflected in the semantic map). In an example, pixels in the semantic map may have respective values that indicate that the object is visible in the first image frame. The electronic device may determine the visible region (i.e., a region in which the static landmark is visible) based on information in the semantic map. That is, the electronic device may determine whether pixels in the first image frame are pixels in the visible region (i.e., in which the static landmark is visible) that because the pixels have values that indicate that the static landmark in the semantic map are visible in the first image frame.

The electronic device may determine the occluded region based on the visible region. For example, the electronic device may determine the occluded region by applying a machine learning model to the visible region. The electronic device may determine an amodal region including the detected visible region and the determined occluded region. The determination of the amodal region using the machine learning model is described with reference to FIG. 6.

In operation 220, the electronic device may determine confidence information for the occluded region in the first amodal region based on the first amodal region.

In an example, the electronic device may determine confidence information for each of a plurality of pixels included in the occluded region (i.e., confidences for the respective pixels in the occluded region). The confidence information may indicate the possibility that a corresponding region (or pixel) is a real amodal region. The determination of the presence of an occlusion region may have a higher error possibility than the determination of the presence of a modal region. Examples of errors may be when a pixel included in the real amodal region is erroneously determined to not be the amodal region and/or when a pixel that is not included in the real amodal region is erroneously determined to be in the amodal region. The real (ground-truth) amodal region may be a region in which the static landmark is visible if another/occluding object is absent. The amodal region may be a region determined by the electronic device to correspond to a landmark.

In an example, the electronic device may determine confidence information based on the ratio between the visible region and the occluded region among the pixels included in the surrounding region of the corresponding region (or pixel) (e.g., a ratio of their relative sizes). An example of determining the confidence information based on the surrounding region is described with reference to FIG. 3.

In an example, the electronic device may determine the confidence information based on a principal component analysis (PCA) for a cluster divided from the amodal region. An example of determining the confidence information based on the PCA is described with reference to FIG. 4.

In operation 230, the electronic device may determine a second amodal region corresponding to the static landmark from a second image frame, in an example when the second image is temporally subsequent to the first image frame. In the second image frame, the second amodal region may include the visible region and the occluded region. The first image frame and the second image frame may correspond to different timepoints. The static landmark may be located at the same physical position at a first timepoint corresponding to the first image frame and at a second timepoint corresponding to the second image frame.

The electronic device may determine the second amodal region from the second image frame, in the same/similar manner as determining the first amodal region from the first image frame. For example, the electronic device may detect the second visible region based on a semantic map obtained from the second image frame. The electronic device may detect the second occluded region from the visible region in the second image frame.

In operation 240, the electronic device may determine transformation information between the first image frame and the second image frame based on the first amodal region, the second amodal region, and the determined confidence information.

The transformation information may include information for transformation from a coordinate system of the first image frame to a coordinate system of the second image frame (or the reverse). The transformation information may include rotation information and/or translation information. The rotation information may indicate a rotation between a first coordinate system of the first image frame and a second coordinate system of the second image frame. For example, the rotation information may indicate the degree to which the first coordinate system rotates around an axis perpendicular to a plane corresponding to an image frame (e.g., the first image frame or the second image frame) relative to the second coordinate system.

The translation information may indicate a translation between the first coordinate system of the first image frame and the second coordinate system of the second image frame. When the first image frame and the second image frame use a planar coordinate system, the translation information may include a first translation value according to a first axis and a second translation value according to a second axis (e.g., a second axis perpendicular to the first axis).

The electronic device may calculate a loss value for the transformation information for the transformation between the first amodal region and the second amodal region. The electronic device may update the transformation information based on the calculated loss value. In various examples of the present disclosure, a transformation function being updated may also be referred to as a "temporary transformation function". The electronic device may calculate the loss value by applying the confidence information to the transformation of the occluded region in the first amodal region. An example of calculating the loss value and determining the transformation information will be described in greater detail below with reference to FIG. 5.

In an example, the electronic device may determine the confidence information for the occluded region in the second amodal region and determine the transformation information based on the confidence information for the occluded region in the second amodal region. For example, the electronic device may determine first confidence information for the occluded region in the first amodal region. The electronic device may determine second confidence information for the occluded region in the second amodal region based on the second amodal region. The electronic device may determine the transformation information based on the first amodal region, the second amodal region, the first confidence information, and the second confidence information. An example of determining the transformation information based on the first confidence information and the second confidence information will be described in greater detail below with reference to FIG. 5.

In operation 250, the electronic device may determine localization information of the electronic device based on the transformation information.

in a non-limiting example, localization information of a target (e.g., the electronic device) may include information about at least one of the position, pose, or movement (e.g., velocity or acceleration) of the target. According to an example, the localization information may include at least one of pose information or position information.

In an example, the electronic device may be provided within or on a moving object (e.g., a vehicle, an airplane, or a helicopter) to control an operation, motion, or driving of the moving object based on the localization information of the electronic device. The localization information of the electronic device may be interpreted as substantially corresponding to the localization information of the moving object. The electronic device may control the driving of the moving object based on the localization information of the electronic device.

For example, the electronic device may be mounted in a vehicle and may control the driving of the vehicle. The electronic device may determine aspects of the motion of the vehicle, including a speed of the vehicle or a pose of the vehicle based on the localization information of the electronic device. The electronic device may adjust the speed of the vehicle based on the determined speed. For example, the vehicle's speed may be adjusted if it is determined that the vehicle is moving too fast or too slow compared to a determined or desired speed for the vehicle. In another example, the electronic device may adjust the steering of the vehicle according to the determined pose based on a desired driving direction, flight path, route, or other desired motion of the vehicle. In an example, the vehicle may be steered to maintain the object within a view of the object or landmark.

Figure 3:
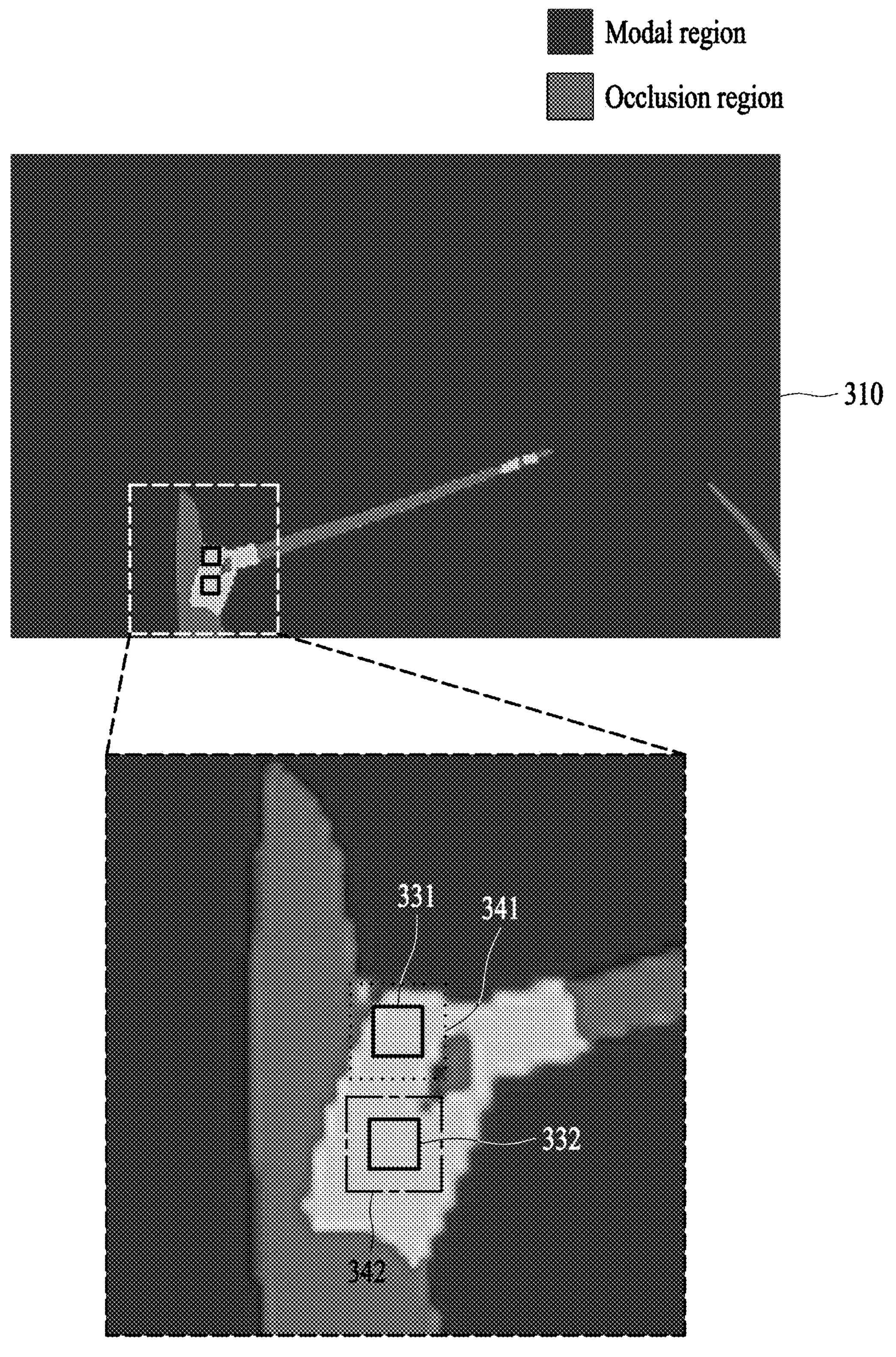
FIG. 3 illustrates an example method of determining confidence according to one or more embodiments.

FIG. 3 illustrates an example method of determining confidence information based on a surrounding region according to one or more embodiments.

In an example, an electronic device (e.g., the electronic device 100 of FIG. 1) may determine confidence information for a target region (or target pixel) based on a modal region and an occlusion region included in a surrounding region of the target region (or target pixel). The surrounding region may be a region set relative to the target region (or target pixel). For example, the surrounding region may include pixels whose distance from the target region (or target pixel) is less than or equal to a threshold value.

Referring to FIG. 3, in a non-limiting example, the electronic device may determine confidence information for an occlusion region in an image frame 310. The electronic device may determine the confidence information based on a modal region and an occlusion region included in a first surrounding region 341 of a first target region 331. The electronic device may determine the confidence information based on a modal region and an occlusion region included in a second surrounding region 342 of a second target region 332.

For example, the electronic device may determine, for a pixel in an occluded region in a first amodal region, confidence information for the pixel based on a first pixel count and a second pixel count of a surrounding region. The first pixel count may correspond to the number of pixels included in a visible region (e.g., a modal region) in the first amodal region among pixels included in the surrounding region of the pixel. The second pixel count may correspond to the number of pixels included in an occluded region (e.g., an occlusion region) in the first amodal region among the pixels included in the surrounding region of the pixel.

For example, the electronic device may determine the confidence information for the pixel based on the ratio of the first pixel count to the sum of the first pixel count and the second pixel count. The confidence information of the electronic device may be determined using the following Equation 1.

$$SS_k = \frac{c_k}{c_k + \hat{c}_k} \qquad \text{Equation 1}$$

$$c_k = \sum_{r \in R_k} I(r \in S)$$

$$\hat{c}_k = \sum_{r \in R_k} I(r \in \hat{S})$$

$$I(\text{statement}) = \begin{cases} 1 & \text{if statement} = \text{true} \\ 0 & \text{else} \end{cases}$$

Here, k denotes a target region (or target pixel), $SS_k$ denotes confidence information based on a surrounding region of the target region (or target pixel), $c_k$ denotes a first pixel count of the surrounding region of the target region (or target pixel), and $\hat{c}_k$ denotes a second pixel count of the surrounding region of the target region (or target pixel). In addition, $R_k$ denotes the surrounding region of the target region (or target pixel), r denotes a pixel included in the surrounding region, S denotes a visible region (e.g., a modal region) in which a static landmark is visible in an image frame, and $\hat{S}$ denotes an occluded region (e.g., an occlusion region) in the image frame.

In an example, the electronic device may determine, for the target region (or target pixel), that the target region (or target pixel) has a high probability of corresponding to a real amodal region in an instance in which the number of pixels corresponding to the modal region is greater than the number of pixels corresponding to the occlusion region in the surrounding region. For example, in FIG. 3, the electronic device may determine confidence information of the second target region 332 to be a lower value than that of the first target region 331 based on the surrounding region 341 of the first target region 331 and the surrounding region 342 of the second target region 332.

The electronic device may apply the confidence information based on the surrounding region (i.e., surrounding region confidence information) to each pixel in the occluded region (e.g., the occlusion region). The electronic device may limit the applying of the surrounding region confidence information to each pixel in a visible region (e.g., the modal region). In another example, the electronic device may apply other confidence information (e.g., “1”), which may be determined independently of the surrounding region confidence information to the modal region. However, the electronic device according to various examples of the present disclosure is not limited to not applying the surrounding region confidence information to the modal region, and the electronic device may also determine and apply surrounding region confidence information for the modal region.

Figure 4:
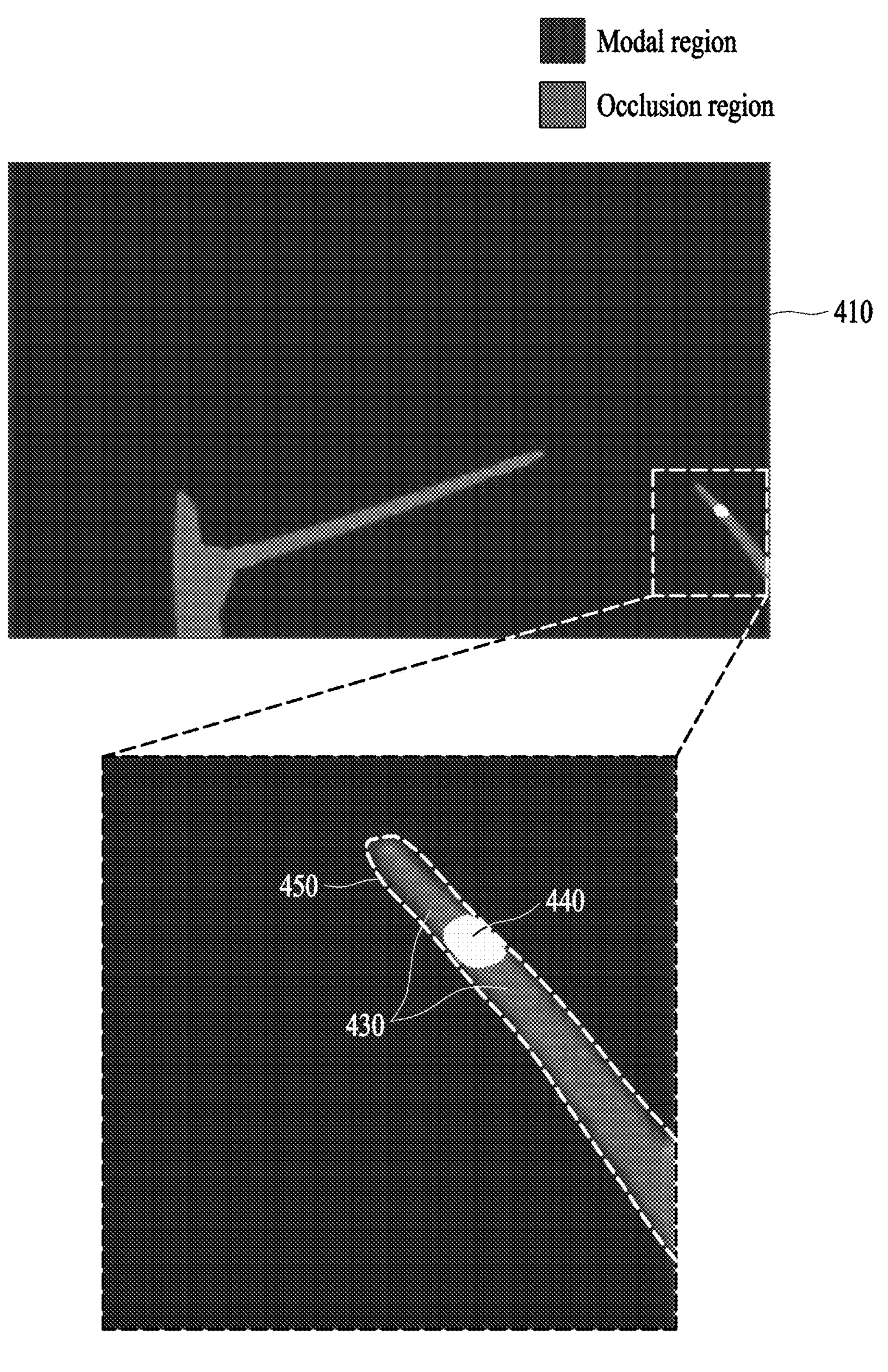
FIG. 4 illustrates an example method of determining confidence information based on a principal component analysis (PCA) according to one or more embodiments.

FIG. 4 illustrates an example method of determining confidence information based on a principal component analysis (PCA) according to one or more embodiments.

Referring to FIG. 4, in a non-limiting example, an electronic device (e.g., the electronic device 100 of FIG. 1) may determine confidence information for a cluster divided from an amodal region based on the linearity of the shape of the cluster.

The linearity of the shape may indicate the degree to which pixels included in the cluster are located along a principal axis. For example, if all the pixels in the cluster are located on the principal axis, the linearity may have the maximum value (e.g., “1”). In another example, if at least a portion of the pixels in the cluster are spaced apart from the principal axis, the linearity may have a first value (e.g., “0.7”) that is smaller than the maximum value.

In an example, the electronic device may use at least one object having a linear type shape as the static landmark. For example, the electronic device may use a parking line and/or a center line marked on the ground as the static landmark.

In an example, the electronic device may determine an amodal region including a modal region (e.g., a modal region 430) and an occlusion region 440 from an image frame 410. The electronic device may divide the amodal region into one or more clusters.

For example, the electronic device may perform clustering based on the distance between pixels in the amodal region. The electronic device may cluster a first pixel and a second pixel that are both included in the amodal region as the same cluster when the distance between the first pixel and the second pixel is less than or equal to a threshold distance.

For example, the electronic device may perform clustering by performing an initial clustering and then dividing one cluster from the initial clustering result into multiple clusters. The electronic device may obtain the initial clustering result by performing clustering based on the distance between pixels. If the average of linearities of respective clusters (e.g., the value based on eigenvalues according to a PCA) increases in the case of dividing one cluster in the initial clustering result into a plurality of clusters, the electronic device may divide the one cluster into the plurality of clusters. For example, if the average of linearities of shapes of respective clusters increases to a certain threshold value, for example, then the electronic device may divide the first cluster into the second cluster and the third cluster based on that threshold value.

For example, as shown in FIG. 4, the electronic device may divide a cluster 450 from the amodal region of the image frame 410.

In an example, the electronic device may determine, for a cluster divided from a first amodal region, confidence information for the cluster based on a PCA of pixels included in the cluster.

The electronic device may obtain a first eigenvalue and a second eigenvalue according to the PCA. The second eigenvalue may be less than or equal to the first eigenvalue. The electronic device may determine confidence information for each pixel included in the cluster based on the ratio of the first eigenvalue to the sum of the first eigenvalue and the second eigenvalue. For example, the confidence information for the cluster (or each pixel included in the cluster) may be determined according to the following Equation 2.

$$LS_k = \frac{\lambda_1^l}{\lambda_1^l + \lambda_2^l} \text{ for } \pi_l \in \hat{S} \cup S \qquad \text{Equation 2}$$

Here, k denotes a target pixel, $\pi_l$ denotes a target cluster including the target pixel, $LS_k$ denotes confidence information based on the linearity of the shape of the target cluster, $$\lambda_1^l$$

denotes a first eigenvalue according to a PCA for pixels in the target cluster, and $$\lambda_2^l$$

denotes a second eigenvalue according to the PCA for the pixels in the target cluster. In addition, S denotes a visible region (e.g., a modal region) in which a static landmark is visible in an image frame, $\hat{S}$ denotes an occluded region (e.g., an occlusion region) in which the static landmark is occluded in the image frame, and $\hat{S} \cup S$ denotes an amodal region corresponding to the static landmark in the image frame.

In a non-limiting example, the electronic device may apply the confidence information for the target cluster to each pixel in an occluded region (e.g., an occlusion region) in the target cluster. The electronic device may limit applying the confidence information for the target cluster to each pixel in a visible region (e.g., a modal region) in the target cluster. For example, the electronic device may apply confidence information (e.g., “1”) determined independently of the confidence information for the target cluster to the modal region. In an example, the electronic device may apply the confidence information for the cluster only to an occlusion region having a higher error probability than error probability of the modal region. The electronic device may apply the confidence information for the cluster only to the occlusion region, thereby reflecting stability in the determination with respect to the modal region and uncertainty in the occlusion region. However, the electronic device according to various examples of the present disclosure is not limited to not applying the confidence information based on the linearity of the target cluster to the modal region, and the electronic device may determine and/or apply confidence information for the modal region based on the linearity of the target cluster.

In an example, the electronic device may determine the confidence information for the occluded region (e.g., the occlusion region), based on first partial confidence information based on the surrounding region and second partial confidence information based on the linearity of the shape of the cluster. The first partial confidence information may be determined based on a first pixel count and a second pixel count of the surrounding region of the target region (or target pixel), as described above with reference to FIG. 3. The second partial confidence information may be determined based on a PCA representing the linearity of a target cluster including the target region (or target pixel), as described above with reference to FIG. 4.

The electronic device may determine, for each pixel in the occlusion region, confidence information for the pixel to be a weighted average of first partial confidence information for the pixel and second partial confidence information for the pixel. For example, the electronic device may determine the confidence information of the target pixel in the occlusion region according to the following Equation 3.

$$F_k = \alpha \cdot SS_k + \beta \cdot LS_k \quad \text{Equation 3}$$

Here, k denotes a target pixel, $SS_k$ denotes first partial confidence information based on a surrounding region of the target pixel, $LS_k$ denotes second partial confidence information based on the linearity of the shape of a target cluster, α denotes a first weight corresponding to the first partial confidence information, and β denotes a second weight corresponding to the second partial confidence information.

According to an example, the electronic device may determine confidence information for a visible region in an amodal region to be a predetermined value (e.g., "1"). The electronic device may determine confidence information for a modal region independently of the surrounding region and/or the cluster.

Figure 5:
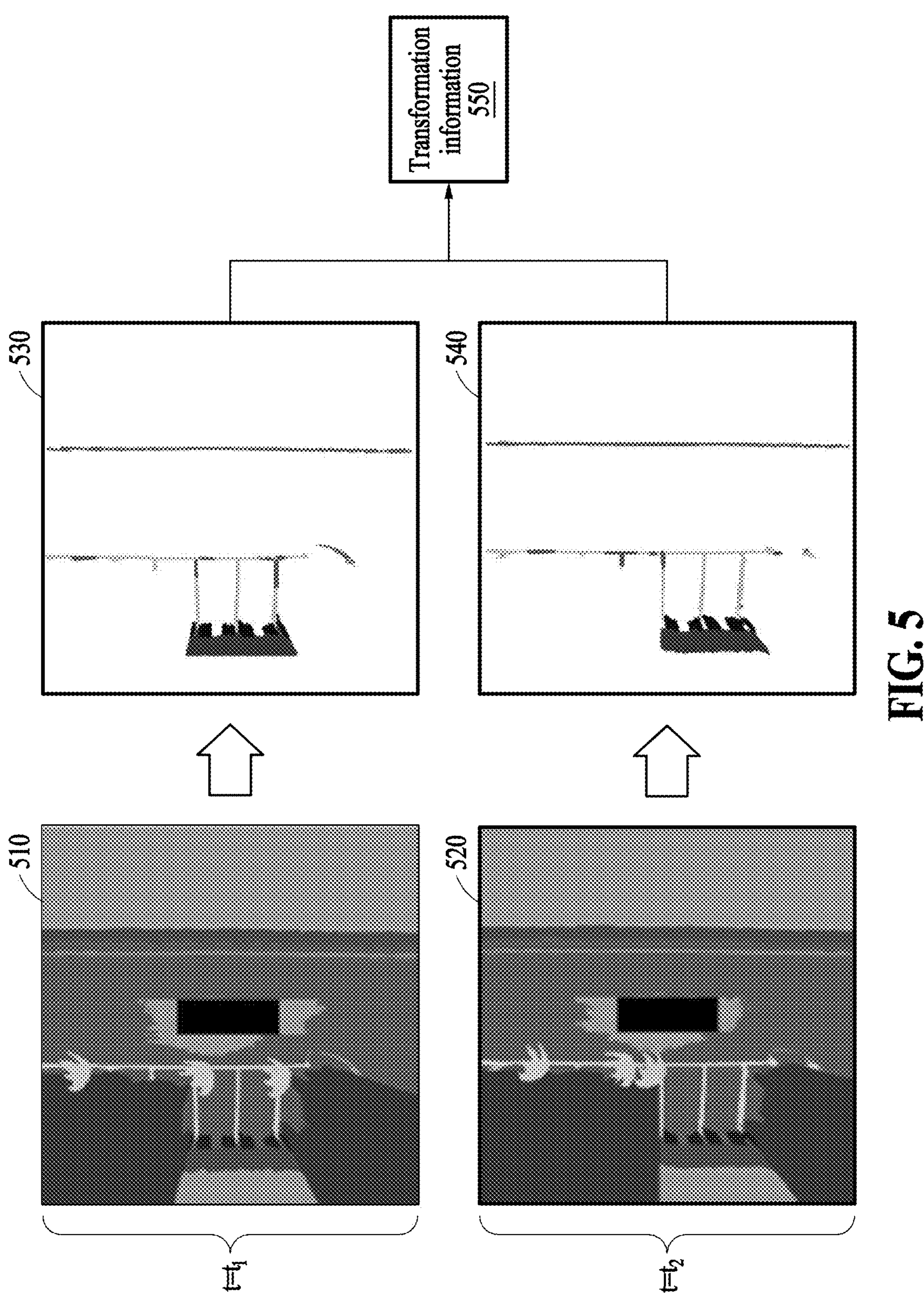
FIG. 5 illustrates an example method of determining transformation information according to one or more embodiments.

FIG. 5 illustrates an example method of determining transformation information according to one or more embodiments.

Referring to FIG. 5, in a non-limiting example, an electronic device (e.g., the electronic device 100 of FIG. 1) may determine transformation information 550 for transformation between a first image frame 510 and a second image frame 520. The electronic device may calculate a loss value for temporary transformation information for transformation between a first amodal region and a second amodal region. The electronic device may update the temporary transformation information based on the loss value.

The electronic device may determine a first amodal region 530 from the first image frame 510 corresponding to a first timepoint $t_1$. The electronic device may determine a second amodal region 540 from the second image frame 520 corresponding to a second timepoint $t_2$.

The electronic device may determine first confidence information for a first occluded region in the first amodal region. The electronic device may determine second confidence information for a second occluded region in the second amodal region.

In an example, the electronic device may determine temporary transformation information between the first image frame 510 and the second image frame 520. The electronic device may calculate a loss value for the temporary transformation information based on at least one of the first confidence information or the second confidence information. The electronic device may perform a transformation between a first pixel in the first amodal region and a second pixel in the second amodal region based on the temporary transformation information. The loss value of the temporary transformation information may be determined based on the difference between a pixel value of the first pixel and a pixel value of the second pixel. A pixel value of a pixel may be determined, for example, to be a first value (e.g., "1") for an amodal region and to be a second value (e.g., "0") for a region other than the amodal region. For example, the electronic device may determine the loss value for the temporary transformation information by accumulating the absolute value (or square) of the difference between the pixel value of the first pixel and the pixel value of the second pixel.

In an example, the electronic device may calculate the loss value of the temporary transformation information based on whether the first pixel is included in the occluded region in the first amodal region or whether the second pixel is included in the occluded region in the second amodal region.

For example, the electronic device may calculate the loss value by applying the first confidence information for the first pixel where the first pixel is included in the occluded region in the first amodal region. The electronic device may apply the first confidence information to a transformation between the first pixel and the second pixel. For example, the electronic device may obtain a first adjustment pixel value by multiplying the pixel value of the first pixel with the first confidence information, for a transformation between the first pixel and the second pixel. The electronic device may calculate the loss value for the temporary transformation information based on the difference between the first adjustment pixel value and the second pixel value.

For example, the electronic device may calculate the loss value by applying the second confidence information for the second pixel where the second pixel is included in the occluded region in the second amodal region. The electronic device may apply the second confidence information to a transformation between the first pixel and the second pixel. For example, the electronic device may obtain a second adjustment pixel value by multiplying the pixel value of the second pixel with the second confidence information, for a transformation between the first pixel and the second pixel. The electronic device may calculate the loss value for the temporary transformation information based on the difference between the first pixel value and the second adjustment pixel value.

For example, the electronic device may apply the first confidence information and the second confidence information to a transformation between the first pixel and the second pixel, based on the first pixel being included in the occluded region in the first amodal region and that the second pixel is included in the occluded region in the second amodal region. For example, for a transformation between the first pixel and the second pixel, the electronic device may obtain the first adjustment pixel value by multiplying the first pixel value with the first confidence information and obtain the second adjustment pixel value by multiplying the second pixel value with the second confidence information. The electronic device may calculate the loss value for the temporary transformation information based on the difference between the first adjustment pixel value and the second adjustment pixel value.

However, various examples of the present disclosure are not limited to obtaining the first adjustment pixel value by applying the first confidence information for the first pixel to the pixel value of the first pixel and/or obtaining the second adjustment pixel value by applying the second confidence information for the second pixel to the pixel value of the second pixel, and the first confidence information and the second confidence information may also apply to the difference between the pixel value of the first pixel and the pixel value of the second pixel.

For example, the electronic device may calculate the loss value for the temporary transformation information according to the following Equation 4.

$$L = \sum_k F_k^1 F_{k'}^2 (a_k - b_{k'})^2 \qquad \text{Equation 4}$$

$$k = f(k')$$

Here, L denotes a loss function for a temporary transformation function, and $f$ denotes a transformation function for transformation from the second image frame 520 to the first image frame 510 based on temporary transformation information. In addition, k denotes a first pixel in the first image frame 510, k' denotes a second pixel in the second image frame 520 transformed to the first pixel in the first image frame 510 through the transformation function, $a_k$ denotes a first pixel value of the first pixel, $$F_k^1$$

denotes first confidence information for the first pixel, $b_{k'}$ denotes a second pixel value of the second pixel, and $$F_{k'}^2,$$

denotes second confidence information for the second pixel.

In an example, the electronic device may update the temporary transformation information based on the loss value. The electronic device may update the temporary transformation information so that the loss value may decrease. When the calculated loss value is less than or equal to a threshold loss value, the electronic device may suspend updating the temporary transformation information and determine the temporary transformation information to be the transformation information 550 between the first amodal and the second amodal.

The transformation information 550 may include rotation information and translation information. Similarly, the temporary transformation information may include temporary rotation information and temporary translation information. For example, the electronic device may determine the transformation information 550 according to the following Equation 5.

$$R, T = \underset{R',T'}{\arg\min} L \qquad \text{Equation 5}$$

Here, R denotes rotation information, T denotes translation information, R' denotes temporary rotation information, T' denotes temporary translation information, and L denotes a loss function for temporary transformation information including the temporary rotation information and the temporary translation information.

For example, in FIG. 5, in the transformation information, a first translation value for a first axis (e.g., the x-axis) may be determined to be 1.3 meters, a second translation value for a second axis (e.g., the y-axis) may be determined to be 0.5 meters, and a rotation value (e.g., yawing) may be determined to be 0.5 radians.

FIG. 6 illustrates an example of determining an occluded region in which a static landmark is occluded from a visible region using a machine learning model according to one or more embodiments.

Referring to FIG. 6, in a non-limiting example, an electronic device (e.g., the electronic device 100 of FIG. 1) may detect a visible region (e.g., a modal region) in which a static landmark is visible from an image frame. The electronic device may determine an occluded region (e.g., an occlusion region) in the image frame by applying a machine learning model 640 to the visible region in which the static landmark is visible.

The machine learning model 640 may include/be a model trained to output a region (e.g., an amodal region) corresponding to the static landmark in the image frame, when applied to the visible region in the image frame. However, the machine learning model 640 is not limited to a model trained to output an occluded region in which the static landmark is occluded, and the machine learning model 640 may also be a model trained to output an amodal region in which the static landmark is occluded.

In an example, the machine learning model 640 may be a model trained using supervised learning. For example, the machine learning model 640 may be a model trained by supervised learning based on a training input 630, a training output 650, and a ground truth 660. The training input 630 may be obtained using a second image 620 generated by adding an object to a first image 610 in which a static landmark is visible. The static landmark may be at least partially occluded by the added object in the second image 620. The training input 630 may be a visible region in the second image 620. The training output 650 may be a region obtained by applying the machine learning model 640 (also referred to as the "temporary machine learning model" in the present disclosure) that is being trained with the training input 630. The ground truth 660 may be a region in which the static landmark detected from the first image 610 is visible.

The electronic device 100, image frame acquirer 110, processor 120, memory 130, and communicator 140 described herein and disclosed herein described with respect to FIGS. 1-6 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:

determining, from a first image frame, a first amodal region including a visible region in which a static landmark is visible and an occluded region in which the static landmark is occluded;

calculating an occluded region confidence information for the occluded region in the first amodal region based on the first amodal region;

determining a second amodal region corresponding to the static landmark from a second image frame temporally subsequent to the first image frame;

calculating first occluded region confidence information for the occluded region in the first amodal region;

calculating second occluded region confidence information for the occluded region in the second amodal region;

calculating transformation information between the first image frame and the second image frame based on the first amodal region, the second amodal region, the first occluded region confidence information, and the second occluded region confidence information;

calculating, for first transformation information for a transformation between the first amodal region and the second amodal region, a loss value by applying the occluded region confidence information to a transformation of the occluded region in the first amodal region;

updating the transformation information based on the loss value; and calculating localization information of an electronic device comprising the processor based on the updated transformation information.

2. The method of claim 1, wherein the calculating of the occluded region confidence information comprises:

calculating, for a first pixel in the occluded region in the first amodal region, first pixel confidence information for the first pixel based on a first pixel count corresponding to a first number of pixels included in the visible region in the first amodal region and a second pixel count corresponding to a second number of pixels included in the occluded region in the first amodal region, among first plural pixels included in a surrounding region of the first pixel.

3. The method of claim 2, wherein the calculating of the first pixel confidence information comprises calculating the first pixel confidence information based on a first ratio of the first pixel count to a sum of the first pixel count and the second pixel count.

4. The method of claim 1, wherein the calculating of the occluded region confidence information comprises calculating, for a cluster divided from the first amodal region, cluster confidence information for the cluster based on a principal component analysis (PCA) of second plural pixels included in the cluster.

5. The method of claim 4, wherein the calculating of the cluster confidence information comprises:

obtaining a first eigenvalue according to the PCA and a second eigenvalue less than or equal to the first eigenvalue; and calculating pixel confidence information for each pixel of the second plural pixels based on a second ratio of the first eigenvalue to a sum of the first eigenvalue and the second eigenvalue.

6. The method of claim 1, wherein the calculating of the transformation information comprises:

calculating, for first transformation information for transformation between a second pixel in the first amodal region and a third pixel in the second amodal region, a loss value by applying the first occluded region confidence information to the first transformation based on that the second pixel is included in the occluded region in the first amodal region; and calculating the loss value by applying the second occluded region confidence information to the transformation between the second pixel and the third pixel based on that the third pixel is included in the occluded region in the second amodal region.

7. The method of claim 1, wherein the determining of whether the first amodal region is visible comprises:

detecting the visible region from the first image frame; and determining whether the occluded region is in the first image frame by applying a machine learning model to the visible region.

8. The method of claim 7, wherein the machine learning model is trained by supervised learning using a visible region in which a static landmark is visible in a first image, and a training input and a training output, the training input and the training output being based on a second image generated by adding an object to the first image in which the static landmark is visible.

9. The method of claim 1, wherein the electronic device is mounted on a moving object, and wherein the method further comprises controlling a motion of the moving object based on the calculated localization information.

10. The method of claim 9, wherein the controlling of the motion of the moving object comprises:

adjusting a speed of the moving object responsive to the transformation information indicating the speed of the moving object is different than a desired speed of the moving object; and adjusting a steering of the moving object responsive to the transformation information indicating the moving object is outside of a desired path for the moving object.

11. An electronic device, comprising:

one or more processors configured to execute instructions; and a memory storing the instructions, wherein execution of the instructions configures the one or more processors to:

determine a first amodal region including a visible region in which a static landmark is visible;

calculate whether an occluded region in which the static landmark is occluded from a first image frame;

calculate occluded region confidence information for the occluded region in the first amodal region based on the first amodal region;

determine a second amodal region corresponding to the static landmark from a second image frame temporally subsequent to the first image frame;

calculate first occluded region confidence information for the occluded region in the first amodal region;

calculate second occluded region confidence information for the occluded region in the second amodal region;

calculate transformation information between the first image frame and the second image frame based on the first amodal region, the second amodal region, the first occluded region confidence information, and the second occluded region confidence; information calculate, for first transformation information for a transformation between the first amodal region and the second amodal region, a loss value by applying the occluded region confidence information to a transformation of the occluded region in the first amodal region;

update the transformation information based on the loss value; and calculate localization information of the electronic device based on the transformation information.

12. The electronic device of claim 11, wherein the one or more processors are further configured to:

calculate, for a first pixel in the occluded region in the first amodal region, first pixel confidence information for the first pixel based on a first pixel count corresponding to a first number of pixels included in the visible region in the first amodal region and a second pixel count corresponding to a second number of pixels included in the occluded region in the first amodal region, among first plural pixels included in a surrounding region of the first pixel.

13. The electronic device of claim 12, wherein the calculating of the first pixel confidence information is based on a first ratio of the first pixel count to a sum of the first pixel count and the second pixel count.

14. The electronic device of claim 11, wherein the one or more processors are further configured to:

calculate, for a cluster divided from the first amodal region, cluster confidence information for the cluster based on a principal component analysis (PCA) of second plural pixels included in the cluster.

15. The electronic device of claim 14, wherein the one or more processors are further configured to:

obtain a first eigenvalue according to the PCA and a second eigenvalue less than or equal to the first eigenvalue, and calculate confidence information for each pixel of the second plural pixels based on a second ratio of the first eigenvalue to a sum of the first eigenvalue and the second eigenvalue.

16. The electronic device of claim 11, wherein the electronic device is provided in a moving object, and wherein the one or more processors are further configured to control a motion of the moving object based on the calculated localization information.

* * * * *